(12) United States Patent
Bi et al.

(10) Patent No.: US 10,014,590 B2
(45) Date of Patent: Jul. 3, 2018

(54) MULTI-ANTENNA ARRAY FOR LONG TERM EVOLUTION MULTI-INPUT MULTI-OUTPUT COMMUNICATION SYSTEM

(71) Applicant: CHINA TELECOM CORPORATION LIMITED, Beijing (CN)

(72) Inventors: Qi Bi, Morris Plains, NJ (US); Shenke Zhang, Beijing (CN); Meng Shi, Beijing (CN); Tao Yang, Beijing (CN); Weiliang Xie, Beijing (CN)

(73) Assignee: China Telecom Corporation Limited, Beijing (CN)

( * ) Notice: Subject to any disclaimer, the term of this patent is extended or adjusted under 35 U.S.C. 154(b) by 324 days.

(21) Appl. No.: 14/773,708

(22) PCT Filed: Apr. 15, 2013

(86) PCT No.: PCT/CN2013/074204
§ 371 (c)(1),
(2) Date: Sep. 8, 2015

(87) PCT Pub. No.: WO2014/169417
PCT Pub. Date: Oct. 23, 2014

(65) Prior Publication Data
US 2016/0043476 A1 Feb. 11, 2016

(51) Int. Cl.
*H01Q 1/24* (2006.01)
*H01Q 21/00* (2006.01)
(Continued)

(52) U.S. Cl.
CPC ......... *H01Q 21/0031* (2013.01); *H01Q 1/246* (2013.01); *H01Q 21/0006* (2013.01);
(Continued)

(58) Field of Classification Search
CPC ............... H01Q 21/0031; H01Q 1/246; H01Q 21/0006; H01Q 21/0025; H01Q 19/10; H01Q 21/24; H01Q 21/061
(Continued)

(56) References Cited

U.S. PATENT DOCUMENTS 3,811,128 A * 5/1974 Munson ................... H01Q 3/44
342/371
4,929,959 A * 5/1990 Sorbello .............. H01Q 9/0428
343/700 MS
(Continued)

FOREIGN PATENT DOCUMENTS

| CN | 1168545 A | 12/1997 |
|---|---|---|
| CN | 2703335 Y | 6/2005 |

(Continued)

OTHER PUBLICATIONS

Jan. 23, 2014—(WO) International Search Report—App PCT/CN2013/074204.

*Primary Examiner* — Dameon E Levi
*Assistant Examiner* — Jennifer F Hu
(74) *Attorney, Agent, or Firm* — Banner & Witcoff, Ltd.

(57) ABSTRACT

A multi-antenna array for a LTE MIMO communication system is provided in an embodiment of this invention, comprising a reflection plate and a power feed network disposed on the back of the reflection plate, a plurality of power distribution plates being arranged on the back of the reflection plate for controlling power distribution for antenna radiation units in different polarization manners respectively, the plurality of power distribution plates being disposed in upper and lower layers and are located at the geometrical center of a parallel plane of the reflection plate. The embodiment of this invention may prevent the scrambled arrangement of the power feed network in a multi-antenna array adopted in a LTE MIMO communica- (Continued)

tion system, simplify power feed manner of antenna radiation units in different polarization manners, reduce complexity and the rate of errors in mass production of multi-antenna arrays of LTE MIMO communication systems, and facilitate locating faults and replacing feed circuits.

11 Claims, 2 Drawing Sheets

(51) Int. Cl.
- *H01Q 21/24* (2006.01)
- *H04B 7/0413* (2017.01)
- *H01Q 21/06* (2006.01)
- *H01Q 19/10* (2006.01)

(52) U.S. Cl.
CPC ....... *H01Q 21/0025* (2013.01); *H04B 7/0413* (2013.01); *H01Q 19/10* (2013.01); *H01Q 21/061* (2013.01); *H01Q 21/24* (2013.01)

(58) Field of Classification Search
USPC .......................................................... 343/835
See application file for complete search history.

(56) References Cited

U.S. PATENT DOCUMENTS

| | | | | |
|---|---|---|---|---|
| 5,467,100 A * | 11/1995 | Chen | ................... | H01Q 15/242 343/756 |
| 5,502,453 A * | 3/1996 | Tsukamoto | .......... | H01Q 15/244 343/700 MS |
| 5,510,803 A * | 4/1996 | Ishizaka | ............... | H01Q 21/061 343/700 MS |
| 5,534,877 A * | 7/1996 | Sorbello | .............. | H01Q 21/061 343/700 MS |
| 5,790,078 A * | 8/1998 | Suzuki | ................... | H01Q 1/247 29/600 |
| 6,008,763 A * | 12/1999 | Nystrom | ................ | H01Q 21/08 343/700 MS |
| 6,061,032 A * | 5/2000 | Sandstedt | .............. | H01Q 1/246 343/700 MS |
| 6,239,750 B1 * | 5/2001 | Snygg | .................... | H01Q 1/246 343/700 MS |
| 6,392,600 B1 * | 5/2002 | Carson | ................... | H01Q 1/246 343/700 MS |
| 9,472,861 B2 * | 10/2016 | Bi | ......................... | H01Q 25/04 |
| 2005/0253769 A1 * | 11/2005 | Timofeev | ............... | H01Q 1/246 343/797 |
| 2006/0132359 A1 | 6/2006 | Chang et al. | | |
| 2006/0273865 A1 * | 12/2006 | Timofeev | ............... | H01Q 1/246 333/161 |
| 2008/0036665 A1 * | 2/2008 | Schadler | ................. | H01Q 1/42 343/700 MS |
| 2012/0280882 A1 * | 11/2012 | Zimmerman | ........... | H01Q 1/42 343/836 |

FOREIGN PATENT DOCUMENTS

| | | |
|---|---|---|
| CN | 101436702 A | 5/2009 |
| CN | 102394359 A | 3/2012 |
| CN | 102570031 A | 7/2012 |
| CN | 102916262 A | 2/2013 |
| JP | 2001085939 A | 3/2001 |
| JP | 2002118420 A | 4/2002 |
| JP | 2003168921 A | 6/2003 |
| JP | 2003223821 A | 8/2003 |
| WO | 2013017104 A1 | 2/2013 |
| WO | 2013044847 A1 | 4/2013 |

* cited by examiner

MULTI-ANTENNA ARRAY FOR LONG TERM EVOLUTION MULTI-INPUT MULTI-OUTPUT COMMUNICATION SYSTEM

The application is a U.S. National Phase Entry of International Application No. PCT/CN2013/074204 filed on Apr. 15, 2013, designating the United States of America. The present application claims priority to and the benefit of the above-identified application and the above-identified application is incorporated by reference herein in their entirety.

TECHNICAL FIELD

The present invention relates to the communication technology, and more specifically, to a multi-antenna array for long term evolution (LTE) multi-input multi-output (MIMO) communication systems.

DESCRIPTION OF THE RELATED ART

Nowadays, mobile communication networks have developed to the third generation (3G) and there are worldwide large-scale deployments and commercial applications of 3G networks. With the continuous popularizing and spreading of data services and the Mobile Internet, the International Organization for Standardization is developing LTE and the fourth generation (4G) and other technical standards for mobile communication, to meet the increasing development of network technology and service capacity. Because the MIMO technology may sufficiently take advantage of separate spatial transmission paths to greatly increase network service speed and link performance, it has become one of the cores of LTE and future 4G technology. In a LTE MIMO communication system, multiple antennas are adopted on both the transmitter and receiver of the communication system to sufficiently take advantage of the spatial degrees of freedom of wireless multipath channels to improve system capacity and the transmission rate, resulting to higher spectral efficiency at the price of increased system complexity, which is a powerful solution to meet the increasing demand for capacity in abundant multipath environments.

Antennas are adopted in a LTE MIMO communication system to directly interface with a transmission channel, and are the most sensitive components to the spatial degrees of freedom in the system. In a conventional LTE MIMO communication system, base stations generally adopt multi-antenna arrays with long distances to realize spatial diversity, in which the antenna unit is in a single-line antenna structure. With the continuous development of the LTE MIMO technology, distances between antennas are increasingly reduced, causing more and more serious coupling between antenna units and a restriction on the further improvement of system performance. In view of this problem, the multi-polarization antenna technology has been proposed, in which multiple antenna units located at the same position are used to sufficiently utilize multiple field components of electromagnetic wave and greatly increase degrees of freedom in a limited space, so as to obtain a gain similar to that of spatial LTE MIMO antennas.

However, in the development of this invention, the inventors have found that the multi-antenna array of existing LTE MIMO communication systems has at least the following problems:

In the existing multi-antenna array adopting the multi-polarization antenna technology, only one power distribution plate is adopted, so that feed circuits of antenna radiation units in different polarization manners are arranged irregularly, resulting to the complex and haphazard arrangement of a power feed network consisted of those feed circuits, not only affecting the radiation efficiency of antenna units, but also increasing complexity and the rate of errors in mass production of multi-antenna arrays; further, in the subsequence use of a multi-antenna array, if a fault occurs in the feed circuit of an antenna radiation unit, it is not easy to locate the fault on the feed circuit and the replacement of the feed circuit is complicated.

SUMMARY OF THE INVENTION

One technical problem to be solved in an embodiment of this invention is: to provide a multi-antenna array for a LTE MIMO communication system in view of the problem of the complex arrangement and the high rate of errors in the power feed network in a multi-antenna array adopted in an existing LTE MIMO communication system, to prevent the scrambled arrangement of the power feed network in a multi-antenna array adopted in a LTE MIMO communication system, simplify power feed of antenna radiation units in different polarization manners, reduce complexity and the rate of errors in mass production of multi-antenna arrays of LTE MIMO communication systems, and facilitate locating faults and replacing feed circuits.

A multi-antenna array for a LTE MIMO communication system is provided in an embodiment of this invention, comprising a reflection plate and a power feed network disposed on the back of the reflection plate; a plurality of power distribution plates arranged on the back of the reflection plate for controlling power distribution for antenna radiation units in different polarization manners respectively, the plurality of power distribution plates being disposed in upper and lower layers and at the geometrical center of a parallel plane of the reflection plate.

In another embodiment of the multi-antenna array for a LTE MIMO communication system described above of this invention, further comprises more than one set of plates for supporting power distribution plates, the more than one set of plates for supporting power distribution plates having different stand heights and being fixed to the reflection plate by fasteners respectively; wherein, one of the plurality of power distribution plates is fixed to the reflection plate by fasteners;

other power distribution plates except for said one power distribution plate are fixed to one set of plates for supporting power distribution plates by fasteners respectively.

In another embodiment of the multi-antenna array for a LTE MIMO communication system described above of this invention, each power distribution plate of the plurality of power distribution plates is connected to feed cables of antenna radiation units in one polarization manner in the power feed network respectively.

In another embodiment of the multi-antenna array for a LTE MIMO communication system described above of this invention, the plurality of power distribution plates particularly comprise two power distribution plates for controlling power distribution for antenna radiation units in two polarization manners respectively.

In another embodiment of the multi-antenna array for a LTE MIMO communication system described above of this invention, each power distribution plate of the plurality of power distribution plates is connected from ports on its left and right sides to feed cables of antenna radiation units in one polarization manner in the power feed network respectively.

In another embodiment of the multi-antenna array for a LTE MIMO communication system described above of this invention, each of some power distribution plates of the plurality of power distribution plates is connected to feed cables of antenna radiation units in one polarization manner in the power feed network respectively;

each power distribution plate except for the some power distribution plates of the plurality of power distribution plates is connected from ports on its both sides to feed cables of antenna radiation units in one polarization manner in the power feed network respectively.

In another embodiment of the multi-antenna array for a LTE MIMO communication system described above of this invention, cables in different colors are used for feed cables of antenna radiation units in different polarization manners in the power feed network.

In another embodiment of the multi-antenna array for a LTE MIMO communication system described above of this invention, the plurality of power distribution plates are all arranged symmetrically with respect to the geometrical center of the reflection plate.

In another embodiment of the multi-antenna array for a LTE MIMO communication system described above of this invention, feed cables on left and right sides of each of the plurality of power distribution plates in the power feed network are connected to corresponding ports on left and right sides of a respective power distribution plate, and the arrangement of feed cables on left and right sides of each power distribution plate is symmetrical with respect to the geometrical center of the reflection plate.

In another embodiment of the multi-antenna array for a LTE MIMO communication system described above of this invention, there are multiple sets of multi-antenna arrays, wherein multiple power distribution plates of the multiple sets of multi-antenna arrays are arranged in "田" shapes on a parallel plane of the reflection plates of the multiple sets of multi-antenna arrays.

In another embodiment of the multi-antenna array for a LTE MIMO communication system described above of this invention, there are multiple sets of multi-antenna arrays, wherein multiple power distribution plates of the multiple sets of multi-antenna arrays are arranged side by side on a parallel plane of the reflection plates of the multiple sets of multi-antenna arrays.

In the multi-antenna array for a LTE MIMO communication system provided based on the above embodiments of this invention, an optimization is made to the multi-antenna array's power feed network adopted in existing LTE MIMO communication systems. Multiple power distribution plates for controlling power distribution for antenna radiation units in different polarization manners are arranged on the back of a reflection plate respectively. The multiple power distribution plates are separately arranged in upper and lower layers, and all of them are located at the geometrical center of a parallel plane of the reflection plate. Because multiple power distribution plates are separately arranged in upper and lower layers for power feed and power distribution control of antenna radiation units in different polarization manners respectively, as compared with the prior art, in the embodiments of this invention, feed circuits of antenna radiation units in different polarization manners are efficiently arranged in a limited feed space of the multi-antenna array separately to simplify power feed manner and prevent the scrambled arrangement of feed circuits of the multi-antenna array, enabling orderly wiring for power feed in the multi-antenna array and easier assembly, greatly reducing com-plexity and the rate of errors in mass production of multi-antenna arrays, and facilitating locating faults and replacing feed circuits.

Below, the technical solution of this invention will be further described in detail with reference to drawings and specific embodiments.

BRIEF DESCRIPTION OF THE DRAWINGS

The accompanying drawings, which are incorporated in and constitute a part of the specification, illustrate embodiments of the invention and, together with the description, serve to explain the principles of the invention.

With reference to the drawings, a more clear understanding of this invention may be obtained from the following description, wherein.

DETAILED DESCRIPTION OF THE EMBODIMENT

Figure 1:
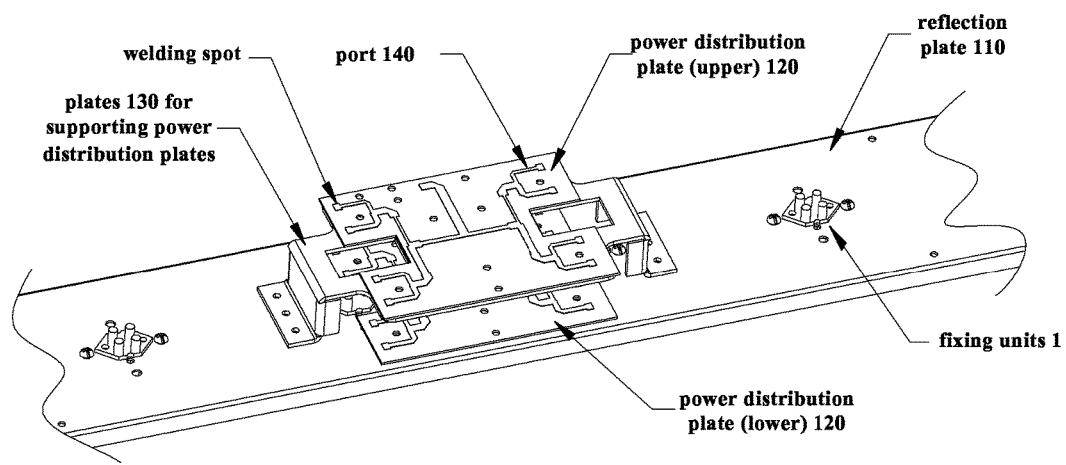
FIG. 1 is a schematic structure diagram of a multi-antenna array for a LTE MIMO communication system of an embodiment of this invention.

Various exemplary embodiments of the present invention will now be described in detail with reference to the drawings. It should be noted that the relative arrangement of the components and steps, the numerical expressions, and numerical values set forth in these embodiments do not limit the scope of the present invention unless it is specifically stated otherwise.

Meanwhile, it should be appreciated that, for the convenience of description, various parts shown in those drawings are not necessarily drawn on scale.

The following description of at least one exemplary embodiment is merely illustrative in nature and is in no way intended to limit the invention, its application, or uses.

Techniques, methods and apparatus as known by one of ordinary skill in the relevant art may not be discussed in detail but are intended to be part of the specification where appropriate.

In all of the examples illustrated and discussed herein, any specific values should be interpreted to be illustrative only and non-limiting. Thus, other examples of the exemplary embodiments could have different values.

Notice that similar reference numerals and letters refer to similar items in the following figures, and thus once an item is defined in one figure, it is possible that it need not be further discussed for following figures.

FIG. 1 is a schematic structure diagram of a multi-antenna array for a LTE MIMO communication system according to an embodiment of this invention. As shown in FIG. 1, the multi-antenna array for a LTE MIMO communication system of this embodiment comprises: a reflection plate 110 and a power feed network disposed on the back of the reflection plate 110 (not shown), wherein the back of the reflection plate 110 is a up-facing side of the reflection plate 110 that may be seen from a top perspective in FIG. 1; antenna radiation units located on the front of the reflection plate 110, i.e., a down-facing side of the reflection plate 110 that may be seen from an upward perspective, which is not shown in FIG. 1. Wherein, multiple power distribution plates 120 for controlling power distribution for antenna radiation units in different polarization manners are disposed on the back of the reflection plate 110 respectively. The multiple power distribution plates 120 are arranged in upper and lower layers, and all of them are located at the geometrical center of a parallel plane of the reflection plate 110. For the sake of clarity, only two power distribution plates 120 are illustrated in FIG. 1 as an example. In the case of more than two power distribution plates 120, reference may be made to the case of two power distribution plates 120, and they may be still arranged in upper and lower layers separately.

In the multi-antenna array for a LTE MIMO communication system provided in the above embodiment of this invention, an optimization is made to the multi-antenna array's power feed network adopted in existing LTE MIMO communication systems. Multiple power distribution plates for controlling power distribution for antenna radiation units in different polarization manners are arranged on the back of a reflection plate respectively. The multiple power distribution plates are separately arranged in upper and lower layers, and all of them are located at the geometrical center of a parallel plane of the reflection plate. Because multiple power distribution plates are separately arranged in upper and lower layers for power feed and power distribution control of antenna radiation units in different polarization manners respectively, as compared with the prior art, in the embodiments of this invention, feed circuits of antenna radiation units in different polarization manners are efficiently arranged in a limited feed space of the multi-antenna array separately to simplify power feed manner and prevent the scrambled arrangement of feed circuits of the multi-antenna array, enabling orderly wiring for power feed in the multi-antenna array and easier assembly, greatly reducing complexity and the rate of errors in mass production of multi-antenna arrays, and facilitating locating faults and replacing feed circuits.

Referring to FIG. 1 again, in a particular embodiment of this invention, the multi-antenna array for a LTE MIMO communication system may further comprise more than one set of plates 130 for supporting power distribution plates, the more than one set of plates 130 for supporting power distribution plates having different stand heights and being fixed to the reflection plate 110 by fasteners. Particularly, the number of plates 130 for supporting power distribution plates may be one less than the number of the power distribution plate 120. Correspondingly, one of the multiple power distribution plates 120 is fixed to the reflection plate 110 by fasteners; other power distribution plates 120 except for the one power distribution plate 120 are fixed to one set of plates 130 for supporting power distribution plates by fasteners respectively.

Further, the number of the plates 130 for supporting power distribution plates may be equal to the number of the power distribution plates 120, and each of the multiple power distribution plates 120 is fixed to one set of plates 130 for supporting power distribution plates by fasteners respectively.

In a particular embodiment of the multi-antenna array for a LTE MIMO communication system of this invention, each of the multiple power distribution plates 120 is connected to feed cables of antenna radiation units in one polarization manner in the power feed network, i.e., coaxial cables for feeding power to the antenna radiation units. According to a particular example of the multi-antenna array for a LTE MIMO communication system according to an embodiment of this invention, but not limitation, the multiple power distribution plates 120 of the various embodiments of this invention described above may particularly comprise two power distribution plates 120 for separately controlling power distribution for antenna radiation units in two polarization manners. A power distribution plate 120 for antenna radiation unit in one polarization manner is mounted on one set of plates 130 for supporting power distribution plates, and is fixed above the other power distribution plate 120 for antenna radiation units in another polarization manner. Feed cables outgoing from antenna radiation units in different polarization manners are connected to upper and lower power distribution plates 120 respectively.

In another particular embodiment of the multi-antenna array for a LTE MIMO communication system of this invention, each of the multiple power distribution plates 120 is connected from ports 140 on its left and right sides to feed cables of antenna radiation units in one polarization manner in the power feed network respectively. Wherein, ports 140 on left and right sides of the power distribution plate 120 are micro-strip access ports on the power distribution plate 120. Feed cables on left and right sides of the power distribution plate 120 are particularly connected to corresponding ports 140 (micro-strip access ports) on its left and right sides through welding.

In another particular embodiment of the multi-antenna array for a LTE MIMO communication system of this invention, each of some power distribution plates of the multiple power distribution plates 120 is connected to feed cables of antenna radiation units in one polarization manner in the power feed network respectively; each power distribution plate except for the some power distribution plates of the multiple power distribution plates 120 is connected from ports 140 on its left and right sides to feed cables of antenna radiation units in one polarization manner in the power feed network respectively.

In a particular application, for example, 50Ω coaxial cables may be used as the feed cables to connect ports 140 on left and right sides of the power distribution plate 120 to output terminals of each antenna radiation unit.

In order to distinguish feed cables of antenna radiation units in different polarization manners, in the multi-antenna array for a LTE MIMO communication system of various embodiments of this invention described above, particularly, cables in different colors may be used for feed cables of antenna radiation units in different polarization manners in the power feed network.

In the multi-antenna array for a LTE MIMO communication system of the various embodiment of this invention describe above, all of the multiple power distribution plates 120 are arranged symmetrically with respect to the geometrical center of the reflection plate 110, i.e., the power distribution plates 120 are centered with respect to a plane of the reflection plate 110 to facilitate symmetrically wiring of coaxial cables on its left and right sides.

Further, for example, feed cables located on left and right sides of each of the multiple power distribution plates 120 of the power feed network are connected to corresponding ports 140 on left and right sides of the corresponding power distribution plate 120 respectively, and the arrangement of feed cables on left and right sides of each power distribution plate 120 are symmetrical with respect to the geometrical center of the reflection plate 110 (also the geometrical center of the multi-antenna array).

For example, the power feed network is arranged in upper and lower layers as shown in FIG. 1 and is located at the center of the multi-antenna array. Feed cables outgoing from LTE antenna radiation units in different polarization manners are connected to the upper and lower power distribution plates respectively and are distinguished by their different colors. Power distribution plates for controlling power distribution for antenna radiation units in different polarization manners are arranged symmetrically. Feed cables located on left and right sides of a power distribution plate are connected to corresponding ports on left and right sides of the power distribution plate respectively. Feed cables on left and right sides of the power distribution plate are arranged symmetrically. Through a lot of assembling experiments performed by the invertors, it has been found that, with such a power feed arrangement, in addition to improved radiation efficiency of the multi-antenna array, complexity and the rate of errors in mass production of multi-antenna arrays may be reduced, while rendering elegant wiring of the antenna array.

Figure 2:
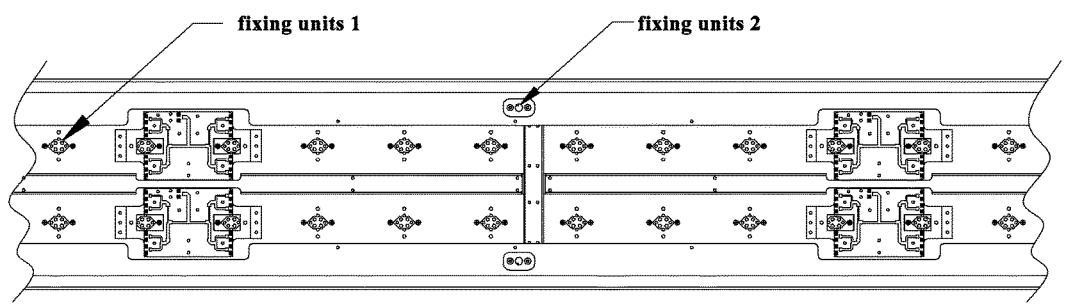
FIG. 2 is a schematic structure diagram of the multi-antenna array for a LTE MIMO communication system of an application embodiment of this invention.

As a particular application of the multi-antenna array for a LTE MIMO communication system of the embodiment of this invention, multiple sets of multi-antenna arrays are provided, wherein multiple power distribution plates 120 of the multiple sets of multi-antenna arrays are arranged in a "田" shape on a parallel plane of the reflection plate 110 of the multiple sets of multi-antenna arrays. FIG. 2 is a schematic structure diagram of the multi-antenna array for a LTE MIMO communication system of an application embodiment of this invention. As shown in FIG. 2, in the "田" shaped arrangement of multi-antenna arrays, their power feed networks are arranged in upper and lower layers, which are located at the center positions of those multi-antenna arrays. Feed cables outgoing from antenna radiation units in different polarization manners are connected to the upper and lower power distribution plates respectively and are distinguished by different colors. Power distribution plates for controlling power distribution for antenna radiation units in different polarization manners are disposed symmetrically. Feed cables located on left and right sides of a power distribution plate are connected to corresponding ports on left and right sides of the power distribution plate respectively. Feed cables on left and right sides of the power distribution plate are arranged symmetrically.

Figure 3:
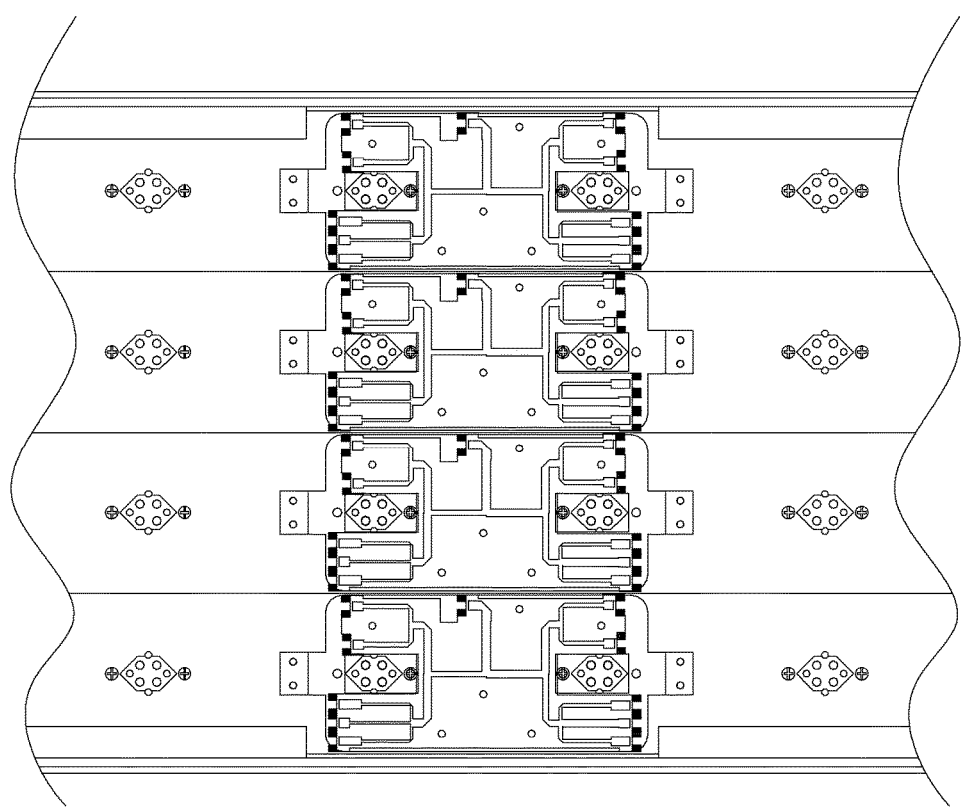
FIG. 3 is a schematic structure diagram of the multi-antenna array for a LTE MIMO communication system of another application embodiment of this invention.

As another particular application of the multi-antenna array for a LTE MIMO communication system of the embodiment of this invention, multiple sets of multi-antenna arrays are provided, wherein multiple power distribution plates 120 of the multiple sets of multi-antenna arrays are arranged side by side on a parallel plane of the reflection plate 110 of the multiple sets of multi-antenna arrays. FIG. 3 is a schematic structure diagram of the multi-antenna array for a LTE MIMO communication system of another application embodiment of this invention. As shown in FIG. 3, in the side by side arrangement of multi-antenna arrays, their power feed networks are arranged in upper and lower layers, which are located at the center positions of those multi-antenna arrays. Feed cables outgoing from antenna radiation units in different polarization manners are connected to the upper and lower power distribution plates respectively and are distinguished by cables in different colors. Power distribution plates for controlling power distribution for antenna radiation units in different polarization manners are disposed symmetrically. Feed cables located on left and right sides of a power distribution plate are connected to corresponding ports on left and right sides of the power distribution plate respectively. Feed cables on left and right sides of the power distribution plate are arranged symmetrically.

In the embodiments of this invention described above, fixing units 1 are used to fix the antenna radiation units to the reflection plate, and fixing units 2 are used to fix the multi-antenna array to the housing of the antenna.

Various embodiments of this invention have been described in a progressive manner, wherein each embodiment has emphases different to other embodiments. A mutual reference can be made to various embodiments for the same or similar portions thereof.

Those skilled in the art may understand that all or parts of method steps of the above embodiments can be implemented by hardware relevant program instruments, which can be stored in a computer readable storage medium, when executing the program executes the steps of the above method embodiments; the above storage medium comprises: ROM, RAM, magnetic disk or optical disk, and any other medium on which program code can be stored.

According to embodiments of this invention, feed circuits of antenna radiation units in different polarization manners are efficiently arranged in a limited feed space of the multi-antenna array separately to simplify power feed and prevent the scrambled arrangement of feed circuits of the multi-antenna array, enabling orderly wiring for power feed in the multi-antenna array and easier assembly, greatly reducing complexity and the rate of errors in mass production of multi-antenna arrays, and facilitating locating faults and replacing feed circuits.

The above statement is given merely for illustration and description, and is not exhaustive, or to limit the invention to the disclosed form. Many modifications and changes are obvious to those skilled in the art. Embodiments are selected and described for a better illustration of the principle and practical application of this invention, so that those skilled in the art can understand this invention and envisage various embodiments with various modifications suited to specific usages.

What is claimed is:

1. A multi-antenna array for a LTE MIMO communication system, comprising:
   a reflection plate;
   a power feed network disposed on the back of the reflection plate; and
   a plurality of power distribution plates arranged on the back of the reflection plate, for controlling power distribution for antenna radiation units in different polarization manners respectively,
   wherein the plurality of power distribution plates are disposed in upper and lower layers parallel to the reflection plate and are located at the geometrical center of the reflection plate.

2. The multi-antenna array of claim 1, further comprising more than one set of plates for supporting power distribution plates, the more than one set of plates for supporting power distribution plates having different stand heights and being fixed to the reflection plate by fasteners respectively;
   wherein, one of the plurality of power distribution plates is fixed to the reflection plate by fasteners; and
   other power distribution plates except for said one power distribution plate are fixed to one set of plates for supporting power distribution plates by fasteners respectively.

3. The multi-antenna array of claim 2, wherein each power distribution plate of the plurality of power distribution plates is connected to feed cables of antenna radiation units in one polarization manner in the power feed network respectively.

4. The multi-antenna array of claim 3, wherein the plurality of power distribution plates particularly comprise two power distribution plates for controlling power distribution for antenna radiation units in two polarization manners respectively.

5. The multi-antenna array of claim 2, wherein each power distribution plate of the plurality of power distribution plates is connected from ports on its left and right sides to feed cables of antenna radiation units in one polarization manner in the power feed network respectively.

6. The multi-antenna array of claim 2, wherein each of some power distribution plates of the plurality of power distribution plates is connected to feed cables of antenna radiation units in one polarization manner in the power feed network respectively;

each power distribution plate except for the some power distribution plates of the plurality of power distribution plates is connected from ports on its left and right sides to feed cables of antenna radiation units in one polarization manner in the power feed network respectively.

7. The multi-antenna array of claim 1, wherein cables in different colors are used for feed cables of antenna radiation units in different polarization manners in the power feed network.

8. The multi-antenna array of claim 7, wherein the plurality of power distribution plates are all arranged symmetrically with respect to the geometrical center of the reflection plate.

9. The multi-antenna array of claim 8, wherein feed cables located on left and right sides of each of the plurality of power distribution plates in the power feed network are connected to corresponding ports on left or right sides of a respective power distribution plate, and the arrangement of feed cables on left and right sides of each power distribution plate is symmetrical with respect to the geometrical center of the reflection plate.

10. The multi-antenna array of claim 7, further comprising multiple sets of multi-antenna arrays, wherein multiple power distribution plates of the multiple sets of multi-antenna arrays are arranged in "田" shapes on a parallel plane of the reflection plates of the multiple sets of multi-antenna arrays.

11. The multi-antenna array of claim 7, further comprising multiple sets of multi-antenna arrays, wherein multiple power distribution plates of the multiple sets of multi-antenna arrays are arranged side by side on a parallel plane of the reflection plates of the multiple sets of multi-antenna arrays.

* * * * *